United States Patent
Lodewyck et al.

(10) Patent No.: US 7,929,700 B2
(45) Date of Patent: Apr. 19, 2011

(54) CONTINUOUS VARIABLE QUANTUM ENCRYPTION KEY DISTRIBUTION SYSTEM

(75) Inventors: Jerome Lodewyck, Paris (FR); Thierry Debuisschert, Orsay (FR); Rosa Tualle-Brouri, Antony (FR); Philippe Grangier, Saint Remy les Chevreuse (FR)

(73) Assignees: Thales (FR); Le Centre National de la Recherche (FR)

( * ) Notice: Subject to any disclaimer, the term of this patent is extended or adjusted under 35 U.S.C. 154(b) by 947 days.

(21) Appl. No.: 11/721,936

(22) PCT Filed: Dec. 15, 2005

(86) PCT No.: PCT/EP2005/056813
§ 371 (c)(1),
(2), (4) Date: Jun. 15, 2007

(87) PCT Pub. No.: WO2006/064037
PCT Pub. Date: Jun. 22, 2006

(65) Prior Publication Data
US 2009/0268901 A1  Oct. 29, 2009

(30) Foreign Application Priority Data
Dec. 15, 2004 (FR) .................................. 04 13337

(51) Int. Cl.
*H04K 1/00* (2006.01)
(52) U.S. Cl. ........................................................ 380/256
(58) Field of Classification Search .................... 380/256
See application file for complete search history.

(56) References Cited

U.S. PATENT DOCUMENTS

| | | | |
|---|---|---|---|
| 5,438,444 A | | 8/1995 | Tayonaka et al. |
| 5,757,912 A | * | 5/1998 | Blow .............................. 380/256 |
| 5,768,378 A | * | 6/1998 | Townsend et al. ............. 380/256 |
| 5,850,441 A | * | 12/1998 | Townsend et al. ............. 380/283 |

(Continued)

OTHER PUBLICATIONS

Grosshans et al, "Continuous variable quantum cryptography using coherent states", Physical Review Letters APS USA, 88(5), pp. 057902/1-4 (Feb. 4, 2002) XP002337784.

(Continued)

*Primary Examiner* — Christian LaForgia
(74) *Attorney, Agent, or Firm* — Lowe Hauptman Ham & Berner, LLP

(57) ABSTRACT

A continuous variable quantum encryption key distribution system comprises a sender (Alice) able to randomly choose the phase and the amplitude of each coherent light pulse of a signal, to provide a coherent state defined by a first quadrature and a second quadrature that are random, and to transmit to a receiver (Bob) the signal pulses (S) and a local oscillator (LO), the receiver comprising a homodyne detector (36) for measuring a randomly chosen quadrature of a signal pulse. The sender comprises a device for time-division multiplexing the pulses of the signal (S) and of the local oscillator (LO) to handle the transmission over an optical fiber (10) of the signal and local oscillator pulses to the receiver. The receiver comprises a demultiplexer (31), able to send the received pulses over a first channel (32), or over a second channel (33). The channels are applied as inputs to the homodyne detector (36). One of the first and second channels includes a phase modulator (34), enabling a random selection by the homodyne detector of a quadrature from the first and the second quadratures of a coherent state of a signal pulse. A delay line (35), is used for resynchronizing the signal and local oscillator pulses.

21 Claims, 3 Drawing Sheets

U.S. PATENT DOCUMENTS

| | | | |
|---|---|---|---|
| 6,188,768 B1* | 2/2001 | Bethune et al. | 380/278 |
| 6,522,749 B2* | 2/2003 | Wang | 380/263 |
| 6,529,601 B1 | 3/2003 | Townsend | |
| 7,092,417 B2* | 8/2006 | Fujii | 372/29.023 |
| 7,298,848 B2 | 11/2007 | Debuisschert | |
| 7,403,623 B2* | 7/2008 | Cerf et al. | 380/278 |
| 2003/0231771 A1* | 12/2003 | Gisin et al. | 380/255 |
| 2004/0052373 A1 | 3/2004 | Debuisschert | |
| 2004/0057526 A1 | 3/2004 | Debuisschert | |
| 2004/0109564 A1* | 6/2004 | Cerf et al. | 380/256 |
| 2004/0151321 A1* | 8/2004 | Lutkenhaus | 380/278 |
| 2004/0161109 A1* | 8/2004 | Trifonov | 380/277 |
| 2004/0200949 A1* | 10/2004 | Beausoleil et al. | 250/214.1 |
| 2004/0200950 A1* | 10/2004 | Beausoleil et al. | 250/214.1 |
| 2004/0200952 A1* | 10/2004 | Beausoleil et al. | 250/214.1 |
| 2005/0078827 A1* | 4/2005 | Tajima | 380/256 |
| 2005/0254823 A1* | 11/2005 | Beausoleil et al. | 398/140 |
| 2006/0023885 A1* | 2/2006 | Trifonov et al. | 380/256 |

OTHER PUBLICATIONS

Grosshans et al, "Reverse reconciliation protocols for quantum cryptography with continuous variables", Proceedings of the 6th International Conference on Quantum Communication, Measurement and Computing, p. 351 (Dec. 2002) XP008050259.

* cited by examiner

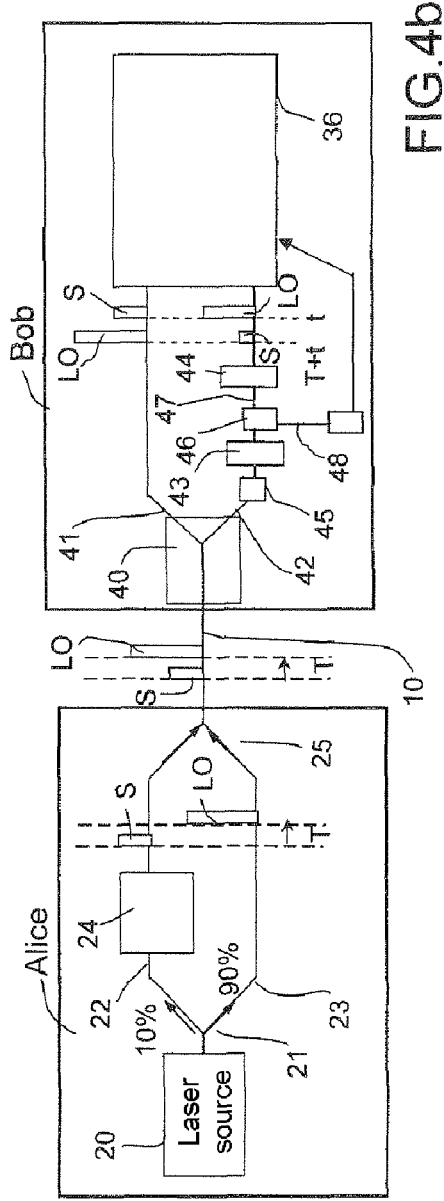
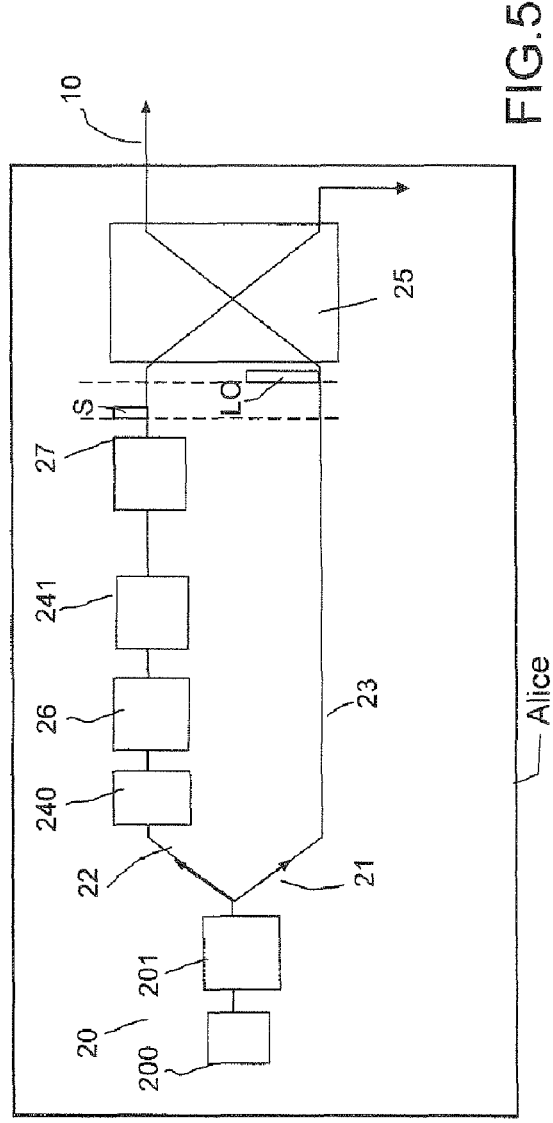
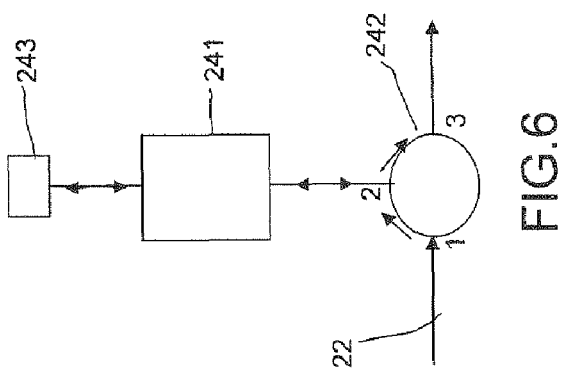

CONTINUOUS VARIABLE QUANTUM ENCRYPTION KEY DISTRIBUTION SYSTEM

CROSS - REFERENCE TO RELATED APPLICATIONS

The present Application is based on International Application No. PCT/EP2005/056813, filed on Dec. 15, 2005, which in turn corresponds to France Application No. 0413337 filed on Dec. 15, 2004, and priority is hereby claimed under 35 USC §119 based on these applications. Each of these applications are hereby incorporated by reference in their entirety into the present application.

1. Field of the Invention

The present invention relates to a quantum encryption key distribution system, normally called QKD system, standing for "Quantum Key Distribution" system, using continuous variables.

It applies in particular to symmetrical or secret key cryptography systems. In these systems, the object is to enable two authorized parties to interchange messages in coded form using a secret key algorithm. A secret key normally comprises a random sequence of bits. The sender and the recipient of the message must exchange this secret key to be able subsequently to perform cryptography operations, for example, encryption, decryption, message authentication.

The security of a symmetrical algorithm thus relies totally on the key that must be kept secret.

Thus, the problem posed by these symmetrical algorithms is that it is necessary for both parties to exchange the key without said key being able to be detected by a third party spying on the interchanges between the sender and the recipient.

A quantum encryption key distribution system makes it possible to overcome this key distribution problem securely by applying the laws of quantum mechanics.

2. Description of the Prior Art

According to standard cryptography terminology, the sender is called "Alice", the recipient or receiver is called "Bob", and the spy is called "Eve". The sending and receiving means associated with the encryption protocol make it possible to quantify the information acquired by the spy.

A quantum distribution system normally requires two transmission channels: a quantum channel, for transmitting the "quantum" information, and an authenticated public channel. This authenticated public channels enables Alice and Bob to communicate. It can be listened to by Eve but without Eve being able to modify anything.

The normal procedure for such a quantum encryption key distribution system comprises the following steps:

1) sending: Alice uses the quantum transmission channel to send a signal containing a quantum information item;
2) receiving: Bob measures the quantum information item in the received signal;
3) reconciling: Alice and Bob process their results, via the authenticated public channel, according to a determined reconciliation protocol. They assess in particular the error ratio of the quantum transmission, which informs them as to the quantity of information that a spy might have been able to obtain. In practice, the presence of a listener on the transmission subsystem between Alice and Bob necessarily provokes a modification of the quantum information item, and, consequently, of the observable errors.

At the end of the reconciliation protocol, Alice and Bob may have a common secret key, in which the number of bits is an inverse function of the error ratio. They can then use this key to have encrypted messages transmitted by means of a secret key cryptography algorithm, for the purposes of confidentiality or authentication, or other purposes.

Having reviewed these very general principles, the invention relates more particularly to a quantum key distribution system, which uses continuous variables. The term quantum continuous variable (QCV) cryptography is used. Such a system uses pulses with a large number of photons (typically 100) and a coherent homodyne detection, unlike the systems which operate by counting photons.

Coherent homodyne detection is easier to implement than photon counting, particularly because it uses conventional photodiodes which have a quantum efficiency close to 100%, whereas that of the photon counters is around 10%. A photon counting system must use photodiodes sensitive to an individual quantum. A continuous variable quantum key distribution system is of particular interest for implementation in a coherent optical telecommunication system.

To be secure, the distribution system needs to implement a reconciliation protocol, after which Alice and Bob have a certain number of bits in common and a privacy amplification protocol, at the end of which Alice and Bob have a secret key. Details on these protocols can in particular be found in the publications by Frédéric Grosshans and Philippe Grangier, entitled "*Continuous variable quantum cryptography using coherent states*", published on 4 Feb. 2002, in Volume 88, Number 5 of the "PHYSICAL REVIEW LETTERS", and "*Reverse reconciliation protocols for quantum cryptography with continuous variables*", published p. 351 in the "Proceedings of the 6th International Conference on Quantum Communication, Measurement and Computing", Rinton Press, December 2002.

The invention relates more particularly to a continuous variable quantum key distribution system, using an amplitude and phase modulation, disclosed in US patent 2004/0109564, entitled "High-rate quantum key distribution scheme relying on continuously phase and amplitude-modulated coherent light pulses". Reference will be made to the text of this patent for all details and explanations concerning the protocols and algorithms used, in particular the reconciliation and privacy amplification protocols, and regarding the security of such a quantum distribution system.

To put it simply, the continuous variable quantum distribution QCV system described uses a good quality coherent light source, such as a laser diode with high spectral purity, associated with an attenuator, such as, for example, a partially reflecting plate. The light beam is divided up at high speed into intense light pulses, each of which has a large number of photons. These light pulses have the following properties:

property 1: they are coherent, that is, they are single-mode in frequency and spectrally fine;
property 2: they are in a coherent state in the quantum mechanics sense: they are limited by the photon noise ("shot noise") both for phase and amplitude fluctuations.

These pulses are used on the one hand to supply a signal and a local oscillator, which will serve as a phase reference. The signal pulses are each modulated in phase and in amplitude relative to the local oscillator, and randomly, according to an appropriate continuous distribution law, such as a Gaussian law. In practice, to allow for homodyne (or coherent) detection, the signal pulses are attenuated relative to the pulses from the local oscillator. To use the example given in the abovementioned patent, the order of magnitude will be up to 250 photons in one signal pulse and $10^8$ photons in a local oscillator pulse.

The receiver therefore implements a pulse-mode homodyne detection.

It is worth remembering that, in the quantum field, homodyne detection measures a quadrature of a low-intensity signal pulse, by making it interfere with a much more intense local oscillator, for example by means of a semi-reflecting plate, and by measuring the intensity on the two output channels obtained. This measurement is typically carried out by standard photodiodes. The output signal from the detection function is the difference between the two intensities measured by the photodiodes. This signal is proportional to the quadrature of the signal pulse.

In a pulse-mode homodyne detection, the local oscillator samples the value of a quadrature of the coherent state of the signal pulse at the instant when the local oscillator pulse arrives at the semi-reflecting plate.

In an example described in the abovementioned patent, Bob and Alice choose a Gaussian distribution law for each of the two quadratures. For each pulse of the signal, Alice randomly selects two values from the associated Gaussian distribution law, to control the modulation of the pulse respectively in phase and in amplitude. The coherent state of the pulse delivered by Alice is then defined by the quadratures whose values are random, and which are stored by Alice. The duly modulated pulses of the signal and the pulses of the local oscillator are transmitted to the receiving device Bob. Bob arbitrarily chooses the phase of the local oscillator for each signal pulse. The homodyne detector provides a measurement of the duly selected quadrature of the corresponding coherent state of each signal pulse.

Bob tells Alice, via the authenticated public channel, which quadrature has been selected, for each signal pulse. At the end of the process of sending a large number of pulses, Alice and Bob share a large number of random correlated Gaussian variables, from which the reconciliation and privacy amplification protocol will extract a private key.

The various protocols implemented in such a system will not be described in further detail. Any detailed description on this subject can in particular be found in the three references cited above.

Such a system is very advantageous in particular in terms of information bit rate, making it possible to envisage high speed secure communications.

One subject of the present invention is an implementation of such a continuous variable quantum key distribution system in a coherent optical telecommunication system, using market-standard optical fibers, between the various sending and receiving devices.

It will be remembered that a coherent telecommunication system is a system that uses a local oscillator.

SUMMARY OF THE INVENTION

Thus, the invention relates to a continuous variable quantum key distribution system, based on a random modulation of the phase and of the amplitude of coherent light pulses, the architecture of which is such that the robustness of the system is assured in the case of a connection by standard fiber between a sender Alice and a receiver Bob, in particular for long-distance communications.

The applicability of such a distribution system to a standard telecommunication system depends on the simplicity of its architecture and its implementation. In particular, the adjustment and alignment problems need to be able to be resolved simply.

One problem that arises is the transmission mode implemented between the sender and the receiver. The local oscillator and the signal must undergo identical disturbances in order to retain the phase reference. For this, they are multiplexed in the same fiber. By analogy with the discrete variable secret key distribution systems, it is possible to envisage using a frequency multiplexing or a multiplexing of the polarization states to transmit over the same telecommunication optical fiber, the signal and the local oscillator necessary to the phase reference between the sender and the receiver, to allow for coherent detection.

The so-called frequency multiplexing systems, while robust, are, however, complex to implement, since they require modulators that are synchronized in transmission and reception, for frequency translations.

The polarization state systems are better suited to telecommunication systems in free space. In practice, the market-standard optical fibers used in coherent telecommunication systems disturb the polarization state of the light pulses, which reduces the robustness of the distribution system. In particular, such systems are ill-suited to long-distance communications.

One subject of the invention is thus a system in which the transmission mode between the sender and the receiver contributes to the robustness and the simplicity of integration in a standard telecommunication system, and enables long-distance optical transmissions.

The security of such a distribution system relies exclusively on the ability to measure quantum noise. Now, the security of the protocol is directly conditional on the losses added by the transmission elements, that is, in particular, the fibers of the telecommunication network, which degrade the signal-to-noise ratio.

One technical problem that arises is in particular how to design a receiver Bob, that can be easily integrated into a standard telecommunication network, which is limited to quantum noise.

More generally, a problem that arises is a distribution system in which the various elements are defined so that the system conforms to the above criteria, that is, that it is easy to implement, easy to integrate and reliable, while operating in the quantum regime.

A solution to these various problems has been found in the invention, in a continuous variable quantum key distribution system using a time-division multiplexing of the signal and local oscillator pulses, and a receiver defined to enable a homodyne detection in pulse mode limited by the quantum noise. When associated with a sender which knows precisely the characteristics of the signal sent, and a good quality pulse source, a system is obtained that resolves the stated various technical problems.

The invention therefore relates to a continuous variable quantum encryption key distribution system, comprising a sender able to randomly choose the phase and the amplitude of each coherent light pulse of a signal, to provide a coherent state defined by a first quadrature and a second quadrature that are random, and to transmit to a receiver the signal pulses and a local oscillator, the receiver comprising a homodyne detector for measuring a randomly chosen quadrature of a signal pulse, characterized in that the sender comprises a device for time-division multiplexing the pulses of the signal and of the local oscillator to handle the transmission over an optical fiber of the signal and local oscillator pulses to the receiver; and in that the receiver comprises:

a demultiplexer, able to send the received pulses over a first channel, or over a second channel, said channels being applied as inputs to the homodyne detector;

one of said first and second channels comprising:
- a phase modulator, enabling a random selection by the homodyne detector of a quadrature from the first and the second quadratures of a coherent state of a signal pulse;
- a delay line, for resynchronizing the signal and local oscillator pulses.

The invention also relates to a coherent optical telecommunication system comprising at least one sender and one receiver of such a key distribution system.

BRIEF DESCRIPTION OF THE DRAWING

Other advantages and characteristics of the invention will become more clearly apparent from reading the description that follows, given for indication and in a non-limiting way, of the invention, and with reference to the appended drawings, in which:

FIG. 4b represents a variant embodiment of a receiver according to the second embodiment of the invention, FIG. 5 illustrates an exemplary embodiment of a sender according to the invention, and FIG. 6 represents a variant embodiment of the phase modulation, in the sender illustrated in FIG. 5.

In the interests of clarity and simplicity, the common elements in the figures are given the same references.

DETAILED DESCRIPTION OF THE INVENTION

Figure 1:
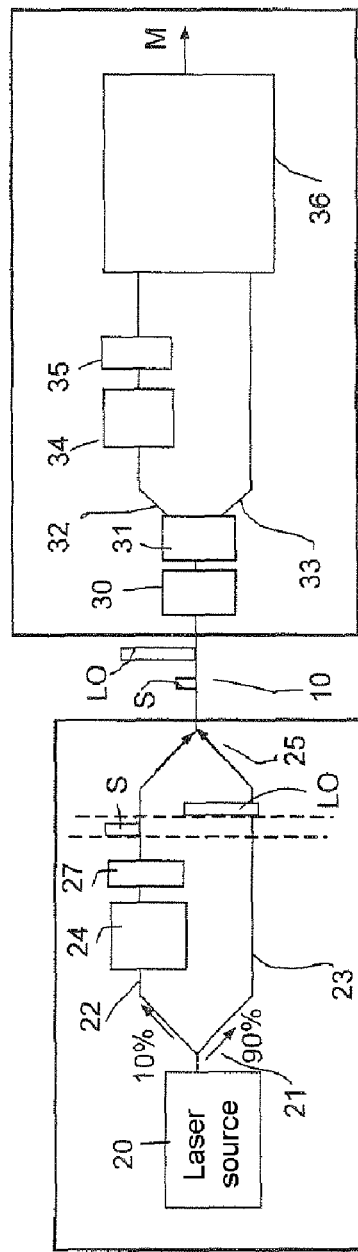
FIG. 1 illustrates an architecture of a continuous variable quantum key distribution system according to the invention.

FIG. 1 generally illustrates a continuous variable quantum key distribution system according to the invention.

It comprises a sender, Alice, and a receiver, Bob, linked by a standard optical fiber 10. On this fiber, the sender Alice sends signal pulses S, randomly modulated in phase and amplitude, and local oscillator pulses LO, in a time-division multiplexing mode.

In the embodiment shown, Alice comprises a coherent light pulse source 20.

This source 20 must be of high quality to provide coherent light pulses, and in a coherent state in the quantum mechanics sense. It typically comprises a light source, such as a continuous laser of high spectral purity, typically a few megahertz supplying a polarized light beam, and an amplitude modulator operating at high rate, able to range up to a few tens of gigahertz. The modulator is used to divide up the beam into intense light pulses, with a pulse time width which can be as short as a few nanoseconds. The continuous laser is, for example, a DFB (Distributed Feedback) laser operating at 1550 nm. The output of the diode is fibered and a Faraday insulator placed at the output of the diode prevents feedback.

A pulse separator 21 is provided to produce the signal pulses which will convey the quantum information to be transmitted to the receiver and the local oscillator pulses necessary to the homodyne detection in the receiver.

The separator 21 is thus a polarization-holding optical coupler, typically positioned at the output of the amplitude modulator (not shown) of the source 20. It sends the signal pulses over a first channel 22 and the local oscillator pulses over a second channel 23. The separator is asymmetrical, to supply weak signal pulses and intense local oscillator pulses, which is typically reflected in a very much higher number of photons in the local oscillator pulses, ultimately, typically in at least a ratio of 100. The number of photons in the signal pulse is adjustable, typically between 0 and around 100 photons. In one example, the coupler is of the 90/10 type (90% of the optical power for the local oscillator, 10% for the signal). In this way, the natural noise of the local oscillator is made negligible in the receiver's homodyne detection device.

Preferably, the optical separator 21 is a fibered Y-configuration, polarization-holding optical coupler.

The signal channel 22 comprises a modulator 24 of the phase and the amplitude of the signal pulses which will be detailed later, with reference to FIG. 5. For each pulse, the coherent state of the output of the modulator is therefore defined by two quadratures of randomly chosen values, defined over a continuous distribution law, such as a zero-average and predefined-variance Gaussian distribution law. These random values are, in practice, stored by Alice for each signal pulse. A delay line 27 in the channel 22 applies a delay to the signal S, relative to the local oscillator which uses the channel 23.

The signal and local oscillator pulses are then recombined in a coupler 25 which receives the local oscillator pulses from the local oscillator channel 23 and the delayed, randomly modulated signal pulses from the signal channel 22. It delivers the duly time-multiplexed signal S and local oscillator LO pulses over an output channel. The delay line 27 and the coupler 25 thus form a time-division multiplexer of the local oscillator and signal pulses.

The receiver Bob according to the invention is defined to limit the losses of all the elements involved in the detection, because the losses degrade the signal-to-noise ratio, which directly conditions the security of the protocol.

It comprises a time-division demultiplexer 31 for sending the pulses over a first channel 32 or a second channel 33.

A homodyne detector 36 receives the two channels 32 and 33 as input, and supplies as output a measurement of a quadrature of each pulse coherent state forming the signal. One of the channels, in the example the channel 32, comprises a random phase modulator 34, and a delay line 35. The random phase modulator makes it possible to randomly select the quadrature that is measured in the homodyne detector 36. The delay line 35 is used to resynchronize the pulses between the two channels 32 and 33. It is in practice determined in such a way as to introduce the delay initiated by the sender between the signal and local oscillator pulses.

Preferably, the receiver also comprises a polarization controller 30 acting on the pulses received over the fiber 10 connected to the input, to correct any depolarization effects linked to the propagation in a standard telecom fiber.

Figure 2:
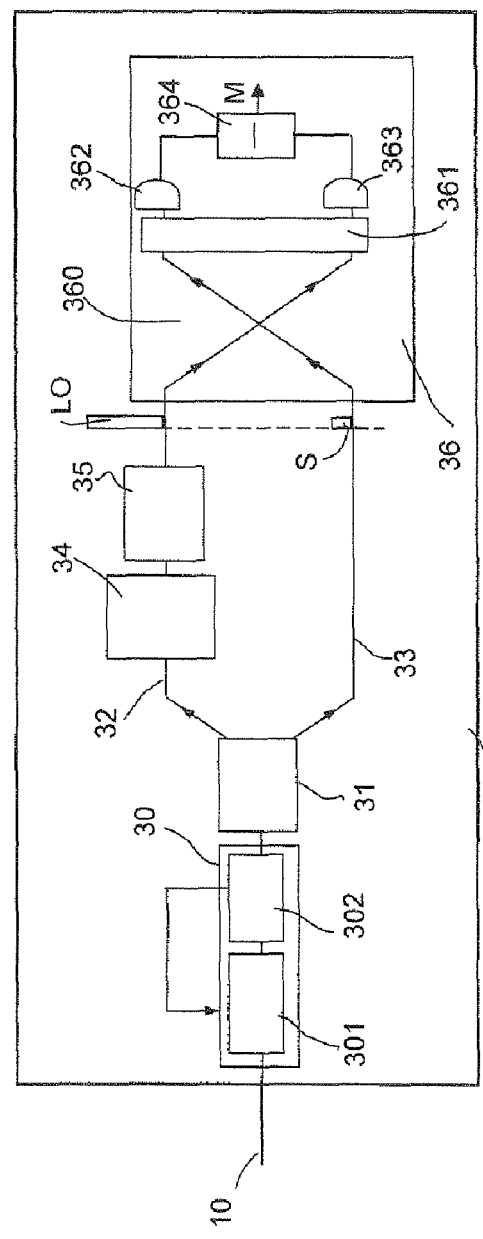
FIG. 2 is a block diagram of a receiver according to a first embodiment of the invention.

A first variant embodiment of the time-division demultiplexing and of the detection function is detailed in FIG. 2. In this embodiment, the time-division demultiplexer 31 is an active optical component, typically an optical switch, which switches the signal and local oscillator pulses to a respective channel, in the example, the signal pulses to the channel 33 and the local oscillator pulses to the other channel 32. An integrated optical switch offers the necessary fast switching, the switching needing to be done during the time separating the local oscillator from the signal, typically of the order of 50 nanoseconds. In practice, a small part of the local oscillator is tapped to synchronize the switching, for example by a 90/10 type coupling to the local oscillator channel.

Preferably, the phase modulation and the delay line are provided on the channel 32 which conveys the local oscillator pulses, so as to minimize the disturbance to the signal bearing the quantum information. In practice, it is implemented by a polarization-holding fiber of given length.

The delay line 35 is used to delay the local oscillator, so as to exactly compensate the delay of the signal (initiated in the sender) on the local oscillator.

The local oscillator pulses are applied to a random phase modulator which makes it possible to randomly select, for each pulse, the quadrature on which the homodyne detection will be carried out. At the output of the channels 32 and 33, the local oscillator LO and the signal S are synchronous. They are applied to the homodyne detection device 36 in pulse mode.

The latter mainly comprises an optical mixer 360, typically a 50/50 fibered optical coupler with low insertion losses, a channel balancing device 361, a photodiode for each channel, referenced 362 and 363 in the figure, and an electronic measuring device 364 which provides a measurement of the selected signal's quadrature. This quadrature is proportional to the quadrature sent by Alice plus the quantum noise of the pulse. The elements of the balancing device 361 are chosen so as to minimize the added noise.

The channel balancing device 361 in particular comprises fine attenuators and variable couplers, associated with programmable or adjustable control electronics.

The electronic measuring device in particular comprises a device for the low-noise amplification of the detection signals, connected to the photodiodes output.

According to the homodyne detection principle, the local oscillator being much more intense than the signal, the fluctuations of the local oscillator are then reflected in correlations between the two channels, which disappear on detecting that the latter is well balanced. It is thus possible to measure extremely weak signals and reveal the quantum effects. The detection device thus provides, at the output M, a string of Gaussian variables correlated with the signal S sent by the sender.

Digital processing means (not shown) handle the storage of these information items used in the reconciliation and privacy amplification protocols to generate the secret key.

In practice, the elements of the detection device are determined for the response time of this device to be short compared to the time intervals separating two pulses; the pulse response of the device must thus be virtually zero on arrival of the next pulse. For example, for pulses transmitted with a repetition rate of 1 megahertz, the bandwidth of the device must typically be 10 megahertz.

In pulse mode, the effects of an imbalance on a homodyne detection are much greater than in continuous mode. The optical assembly and the electronics of the detector are therefore carefully determined for most of the fluctuations of the signal pulses to be detected to be due to the quantum noise. Thus, the detector is designed to minimize the effects of the thermal drifts. In particular, the photodiodes are chosen to have quasi-identical responses or responses that are as close as possible, and to have maximum quantum efficiency. They can be fibered.

The use of a fibered optical mixer makes it possible to ensure a good optical balance on the two output channels. The balancing device 361 comprises attenuators and/or variable couplers and adjustment electronics, from which the noise must be reduced to the minimum. The electronic measuring device 364 comprises very low noise amplifiers. These are preferably load amplifiers, for overcoming the thermal noise of the input impedance of the voltage amplifiers.

The receiver preferably comprises a polarization controller 30. A polarizer controller normally comprises a polarimeter 302 which analyzes the polarization of the pulses to measure a (slow) drift of this polarization and apply a correction by a polarization corrector 301, typically a birefringent element.

According to a first variant shown in FIG. 2, the polarimeter is positioned between the polarization corrector 301, at the input of the receiver, and the optical switch 31. It taps a small part of the pulses received, to analyze their polarization, and to determine a correction relative to a polarization reference given by the natural polarization axis of the optical switch 31. In this variant, the tapping by the polarimeter of some of the pulses causes losses on the signal.

Figure 3:
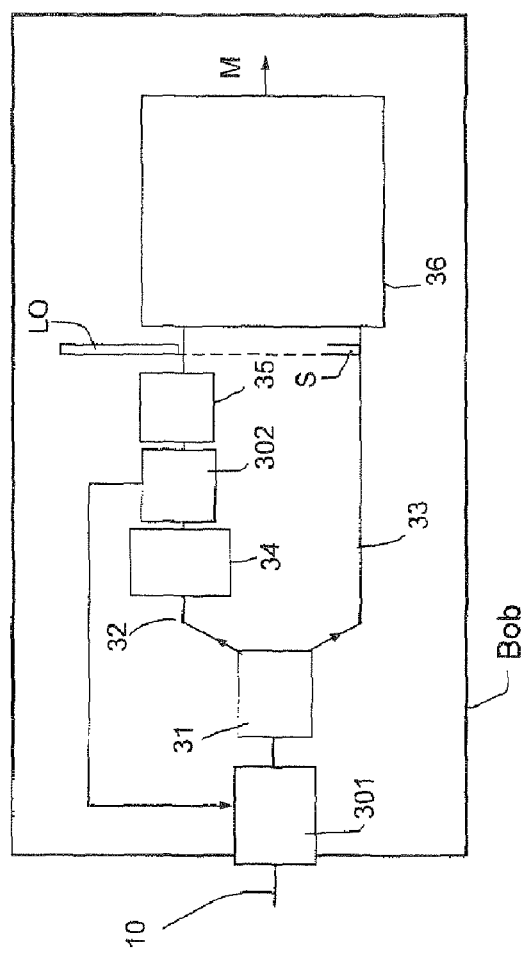
FIG. 3 illustrates a variant embodiment of the receiver of FIG. 2.

According to a second variant shown in FIG. 3, the polarimeter is positioned on the channel 32 from the local oscillator. In this way, the signal is unaffected by the polarimeter losses.

It will be noted that, in these two variants, the place of the phase modulator and of the local delay line in the channel 32 is immaterial and can be changed.

The delay line is defined to compensate the delay initiated by the sender.

Figure 4A:
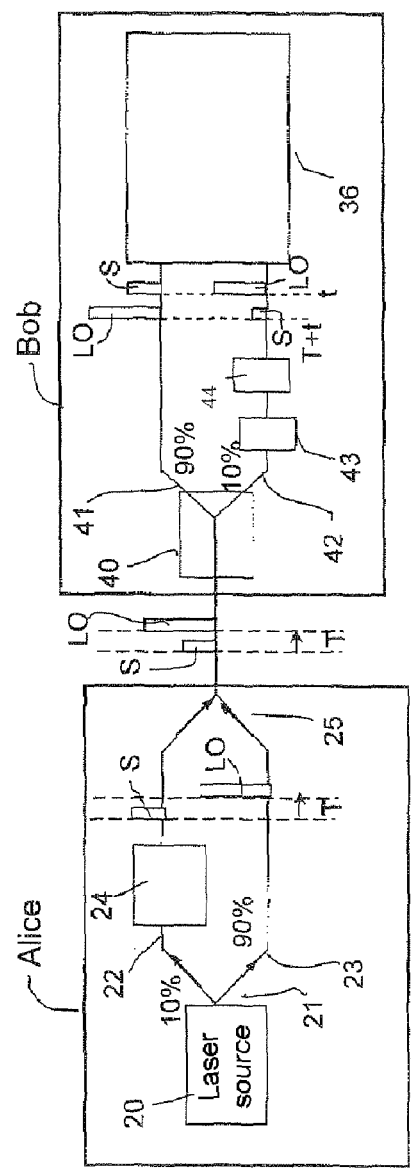
FIG. 4a is a block diagram of a receiver according to a second embodiment of the invention.

FIG. 4a illustrates another embodiment of the detection device used for the random variable quantum key distribution system.

To be able to use this type of detection, it is necessary for Alice to alternately send the signal pulses and the local oscillator pulses in the transmission line 10. Also, two successive pulses must be separated by the same time T.

A major difference lies in the time-division demultiplexing which is carried out not in an active way by an optical switch as in the embodiment illustrated in FIGS. 2 and 3, but by a passive circuit, typically an optical coupler.

The receiver Bob thus comprises an optical coupler 40, which sends the input pulses over a channel 41 or another channel 42. The signal and local oscillator pulses are no longer separated. They are on both the channels, as illustrated in FIG. 4a.

As previously, in FIGS. 2 and 3, one channel comprises a phase modulator 43 and a delay line 44.

The delay line is calibrated so that, in practice, each signal, respectively local oscillator, pulse on the channel 41, is synchronized with the "complementary" local oscillator, respectively signal, pulse of the channel 42. The delay line takes account of the time offset T between the signal and local oscillator pulses initiated by the sender Alice and the delay between the two channels 42 and 41.

The receiver, Bob, randomly modulates the phase of each pulse that it receives, signal or local oscillator, so as to select the quadrature on which the measurement must be made by the detection device 36.

If the optical coupler 40 is of the 50/50 type, the light power of the pulses is reduced by half on both channels. To obtain the complete measurement of the quantum information, it is thus necessary to combine two successive detection measurements. Typically, if the first measurement is done at the time t, the next measurement at the time t+T must be combined with the first to provide the information associated with a signal pulse S.

The polarization control can be identical to that shown for the previous device, in relation to FIGS. 2 and 3.

FIG. 4b illustrates another alternative, which makes it possible to dispense with the polarization control.

In this alternative, the passive coupler 40 used for the demultiplexing is chosen to be insensitive to the polarization. The only element of the receiver that depends on the polarization is then the phase modulator 43.

Provision is made to make the phase modulator independent of the polarization, to make the whole of the detection function insensitive to the polarization.

A polarizer 45 is placed at the input of the phase modulator 43 and a symmetrical coupler 46 (50/50) is placed at the output of the phase modulator. One output channel 47 passes via the delay line 44 to the homodyne detection circuit 36. The other output channel 48 from the coupler 46 is a channel that can be used to measure the intensity of the local oscillator, typically by means of a photodiode, which enables the detector 36 to calibrate the result of the quadrature measurement of each signal pulse by digital processing.

In a variant, the coupler 40 of the receiver illustrated in FIG. 4a and in FIG. 4b is chosen to be asymmetrical, for example in a ratio of 90/10. The most attenuated channel is the channel 42 to which the random phase modulation and resynchronization (delay line) are applied. Most of the signal pulses pass along the channel 41. The quantum information item is therefore not at all, or very little, altered. In this case, it is possible to do only one measurement, corresponding to the highest amplitude of the signal pulse subject to being able to tolerate the loss of the attenuated signal pulse and the corresponding additional noise. It is, however, essential to strongly increase the intensity of the local oscillator sent by Alice to compensate the losses of the coupler 40.

This system of demultiplexing by coupling between the two channels described in relation to FIG. 4a and FIG. 4b requires a very precise calibration, by the sender Alice, of the time interval T between two successive signal and local oscillator pulses over its output channel. Thus, the sender must include a delay line calibrated to impose this interval T exactly. This aspect will be detailed later in conjunction with FIG. 5. In practice, T can be of the order of a few tens of nanoseconds, compatible with the time resolution possibilities of the receiver's homodyne detector 36.

The receiver elements in the different configurations envisaged are preferably provided in integrated optics, and fibered, by polarization-holding fibers. The receiver thus uses standard optical elements for coherent optical telecommunications, but chosen carefully and in a configuration that makes it possible to obtain the desired limitation to quantum noise and the minimization of losses.

FIG. 5 illustrates a sender Alice which can advantageously be used in the invention, with integrated, fibered optical elements.

The intense light pulse source 20 comprises, in the example, a laser diode 200, the output of which is fibered, sending a polarized laser beam of high spectral purity, strongly attenuated, to produce a beam of a few tens of milliwatts. A Faraday insulator is provided at the output of the diode to avoid feedback (not shown). The source 20 also comprises an amplitude modulator 201, for dividing up the beam into very fine pulses (the time-width of which can be as fine as a few nanoseconds for example) at high speed. Said modulator has a dynamic range of at least 30 dB in intensity to then allow for an amplitude modulation with a high sampling dynamic range. This aspect has already been detailed previously in relation to FIG. 1.

An asymmetrical optical coupler 21, typically a 90/10 coupler, is used to separate the pulses into intense pulses from a local oscillator, on the channel 23, and weak signal pulses on the channel 22. The coupler is of the polarization-holding type (that is, it is formed by polarization-holding fibers).

The random phase and amplitude modulator 24 typically comprises a random amplitude modulator 240 and a random phase modulator 241. They are preferably based on integrated optics, in order to have high bandwidths, typically of the order of ten or so gigahertz, and with high performance characteristics (that is, with low internal losses). In order to obtain a high modulation dynamic range, the amplitude modulator has at least a dynamic range of 30 dB in intensity, and the phase modulator a dynamic range of at least 180° on the phase.

The elements are chosen for the insertion losses to be as low as possible.

In a refinement, a polarization controller 26 is provided, positioned between the random amplitude modulator 240 and the random phase modulator 241. While the order of the modulators is immaterial in theory, in practice it is preferable to place the amplitude modulator first, which makes it possible to have a well defined polarization at the input of the phase modulator 241. This controller makes it possible to compensate (correct) any alignment defects between the natural axes of the polarization-holding fibers, and the natural axes of the modulators 240 and 241.

These alignment defects can also be compensated by associating an optical circulator 242 and a Faraday mirror 243 with the phase modulator 241. It is then not necessary to place a polarization controller at the input of the phase modulator 241. The phase modulation is then provided by an assembly represented in FIG. 6, consisting of the optical circulator (242), placed on the signal pulse transmission channel 22, and the phase modulator (241) with the Faraday mirror (243). This assembly then operates as follows: the signal pulse on the channel 22 enters via the channel 1 of the circulator 242, then it performs a round trip in the phase modulator 241. Between the outward and return legs, the pulse is reflected on the Faraday mirror 243 placed at the output of the modulator. Said modulator applies a 90° rotation to the polarization of the pulse. The pulse performs a second trip in the modulator. The defects seen in the outward leg are then compensated by those seen in the return leg. The pulse leaves again via the channel 3 of the circulator.

The modulators are controlled on the basis of desired random phase and amplitude values, typically encoded on n bits, n for example being of the order of 11 to 16 bits, supplied by a random generator. The resultant distribution in the complex plane is a continuous distribution law, typically a zero-average and predefined-variance polar Gaussian law.

These random values are transformed by an appropriate software function into electrical control voltages, so as to eliminate the defects (non-linearities or shifts) of the phase-voltage response of the phase modulator 241. The settings of the phase and amplitude modulators 241 and 240 are optimized to obtain a response that is as linear as possible between the electrical control and the optical pulse modulation.

Finally, a delay line 27 is provided to delay each signal pulse relative to the "corresponding" local oscillator pulse, by a predetermined interval. Typically, to add a delay of 50 nanoseconds, a polarization-holding fiber with a length of around 10 meters will be provided.

In the case of a system with a receiver according to the second embodiment illustrated in FIG. 4a and FIG. 4b, the accuracy on the delay T is obtained by finely adjusting the fiber length.

It will be noted that the invention applies to the particular case of a "plug and play" type system, and one that corresponds to a configuration of the system in which the source is no longer integrated in the sender, but with the detection part in the receiver. In this case, the pulses perform a round trip in the communication fiber between the sender and the receiver.

A continuous variable quantum key distribution system according to the invention is simple to implement and easy to incorporate in a coherent optical telecommunication system, using market-standard optical fibers. This system is based on a communication device that can operate at the 1550 nanometer so-called telecom wavelength, which can be entirely produced using available telecom components, which makes it possible to:
- produce a signal comprising a coherent state: light pulse limited by the quantum noise,
- produce a local oscillator having a defined phase relationship with the signal,
- modulate the signal both in amplitude and in phase,
- transmit the local oscillator and the signal in the same fiber while maintaining their phase relationship, by time-division multiplexing,
- separate the local oscillator from the signal on reception,
- measure a random quadrature of the signal and its natural noise, by homodyne detection limited by the quantum noise.

The invention claimed is:

1. A continuous variable quantum encryption key distribution system, comprising:
   - a sender configured to randomly choose the phase and the amplitude of each coherent light pulse of a signal, to provide a coherent state defined by a first quadrature and a second quadrature that are random;
   - a local oscillator configured to generate local oscillator pulses serving as a phase reference relative to which the phase of the signal is defined, the local oscillator pulses being great compared to the signal pulses; and
   - a receiver for receiving signal pulses from said sender and including a homodyne detector for performing a measurement limited by the quantum noise to measure a randomly chosen quadrature of a signal pulse,
   - wherein the sender comprises a time-division multiplexer for multiplexing transmission of the signal and the local oscillator pulses with a predetermined time interval between successive transmission of the signal and the local oscillator pulses over an optical fiber to the receiver; and
   - wherein the receiver further comprises:
     - a demultiplexer configured, to send the received pulses over a first channel, or over a second channel, said channels being applied as inputs to the homodyne detector;
     - one of said first and second channels comprising:
       - a phase modulator for enabling a random selection, by the homodyne detector, of a quadrature from the first and the second quadratures of a coherent state of a signal pulse; and
       - a delay line for resynchronizing the received signal and local oscillator pulses between the first and second channels, the delay line being calibrated to impose a time delay that is equal to the predetermined time interval.

2. The quantum key distribution system as claimed in claim 1, wherein the demultiplexer is an optical switch able to separate the signal pulses and the local oscillator pulses, to respectively send the signal pulses over one channel and the local oscillator pulses over the other channel, and the phase modulator and the delay line are provided on the channel associated with the local oscillator pulses.

3. The quantum key distribution system as claimed in claim 1, wherein the time-division multiplexing device is such that it imposes the predetermined time interval T between a local oscillator pulse and a signal pulse that succeed each other and in that the demultiplexer is an optical coupler able to send the pulses received as input over a first channel or a second channel, one of the channels comprising the phase modulator and the delay line, and in that said delay line is calibrated to impose a delay equal to said predetermined time interval T between a signal pulse, respectively local oscillator pulse, on one channel, and a local oscillator pulse, respectively signal pulse, on the other channel.

4. The quantum distribution system as claimed in claim 3, wherein said coupler is of the symmetrical type.

5. The quantum distribution system as claimed in claim 3, wherein said coupler is of the asymmetrical type, to supply the major part of the signal to the channel without phase modulator and a small part of the signal to the channel including the phase modulator.

6. The quantum distribution system as claimed in claim 1, wherein the homodyne detector performs, for each pulse detected, a first measurement at an instant t and a second measurement at an instant t+T, to obtain, for each signal pulse, a complete measurement of the chosen quadrature.

7. The quantum key distribution system as claimed in claim 3 comprising a polarizer positioned at the input of the phase modulator and a symmetrical coupler at the output, said coupler providing a measurement output for the local oscillator, enabling the detection device to calibrate the quadrature measurement of each signal pulse.

8. The continuous variable quantum key distribution system as claimed in claim 3, wherein the homodyne detector comprises a device for balancing the input channels, the elements of which are chosen so as to minimize the added noise.

9. The continuous variable quantum key distribution system as claimed in claim 3, wherein the elements of the receiver are each implemented on an integrated optical basis, interconnected by polarization-holding fibers.

10. A coherent telecommunication system, comprising at least one sender and one receiver of a quantum key distribution system as claimed in claim 3, said sender and receiver being connected by a standard optical telecommunication fiber.

11. The continuous variable quantum distribution system as claimed in claim 1, wherein the receiver comprises a polarization controller comprising a polarization corrector device and a polarimeter, which polarimeter performs a polarization state measurement of the pulses received by the receiver to order an appropriate correction on said polarization corrector device.

12. The continuous variable quantum key distribution system as claimed in claim 11, wherein said polarimeter is positioned between the corrector device and the optical switch, on one and the same optical channel.

13. The continuous variable quantum key distribution system as claimed in claim 11, wherein in the receiver, said polarimeter is positioned after the demultiplexer, on the channel that includes the phase modulator.

14. The continuous variable quantum key distribution system as claimed in claim 1, wherein the homodyne detector comprises a device for balancing the input channels, the elements of which are chosen so as to minimize the added noise.

15. The continuous variable quantum key distribution system as claimed in claim 1, wherein the elements of the receiver are each implemented on an integrated optical basis, interconnected by polarization-holding fibers.

16. A coherent telecommunication system, comprising at least one sender and one receiver of a quantum key distribution system as claimed in claim 1, said sender and receiver being connected by a standard optical telecommunication fiber.

17. The continuous variable quantum key distribution system as claimed in claim 1, wherein the homodyne detector comprises a first input port and a second input port coupled to the demultiplexer, and the delay line is configured to allow the received signal and delayed local oscillator pulses, or received local oscillator pulses and delayed signal, to be applied to the first input port and the second input port synchronously.

18. A continuous variable quantum encryption key distribution system, comprising:
- a sender configured to randomly choose the phase and the amplitude of each coherent light pulse of a signal, to provide a coherent state defined by a first quadrature and a second quadrature that are random;
- a local oscillator configured to generate local oscillator pulses serving as a phase reference relative to which the phase of the signal is defined, the local oscillator pulses being great compared to the signal pulses;
- a receiver for receiving signal pulses from said sender and including a homodyne detector for performing a measurement limited by the quantum noise to measure a randomly chosen quadrature of a signal pulse; and
- a source of coherent light pulses incorporated in the sender or in the receiver, to provide the signal and local oscillator pulses and said pulse source comprising a source of a polarized attenuated laser beam, associated with an amplitude modulator able to divide up said beam into coherent light pulses, said modulator having a dynamic range of at least 30 dB in intensity,
- wherein the sender comprises a device for time-division multiplexing the pulses of the signal and of the local oscillator to handle the transmission over an optical fiber of the signal and local oscillator pulses to the receiver; and
- wherein the receiver comprises:
  - a demultiplexer, able to send the received pulses over a first channel, or over a second channel, said channels being applied as inputs to the homodyne detector, one of said first and second channels comprising:
  - a phase modulator, enabling a random selection by the homodyne detector of a quadrature from the first and the second quadratures of a coherent state of a signal pulse;
  - a delay line, for resynchronizing the signal and local oscillator pulses.

19. The continuous variable quantum key distribution system as claimed in claim 18, wherein the pulse source is incorporated in the sender, said sender also comprising a polarization-holding optical coupler between said source and a local oscillator channel and a signal channel, said optical coupler being positioned after the beam dividing amplitude modulator, and in that the signal channel comprises said random phase and amplitude modulation device and a delay line.

20. The quantum key distribution system as claimed in claim 19, wherein the random modulation device of said sender comprises a random amplitude modulator and a random phase modulator in integrated optical form, said modulators being connected by polarization-holding fibers, and a polarization controller is positioned on the signal channel, to compensate the alignment defects between the natural axes of said polarization-holding fibers and said amplitude and phase modulators.

21. The quantum key distribution system as claimed in claim 19, wherein said random phase modulator is associated with an optical circulator and a Faraday mirror, said optical circulator being positioned on the signal channel and the phase modulator and the Faraday mirror being such that a signal pulse incoming via an input channel of the circulator performs a round trip in the modulator, with a reflection on the Faraday mirror between the outward and return legs, before leaving again via an output channel of the circulator, on the signal channel.

\* \* \* \* \*